(12) United States Patent
Korpipää et al.

(10) Patent No.: US 8,407,593 B2
(45) Date of Patent: Mar. 26, 2013

(54) METHOD, APPARATUS AND COMPUTER PROGRAM PRODUCT TO UTILIZE CONTEXT ONTOLOGY IN MOBILE DEVICE APPLICATION PERSONALIZATION

(75) Inventors: Panu Korpipää, Oulu (FI); Jonna Häkkilä, Kalajoki (FI); Juha Kela, Oulu (FI); Sami Ronkainen, Oulu (FI); Ilkka Känsälä, Oulu (FI); Jani Mäntyjärvi, Oulu (FI); Urpo Tuomela, Oulu (FI)

(73) Assignee: Nokia Corporation

( * ) Notice: Subject to any disclaimer, the term of this patent is extended or adjusted under 35 U.S.C. 154(b) by 518 days.

(21) Appl. No.: 11/172,222

(22) Filed: Jun. 29, 2005

(65) Prior Publication Data

US 2006/0005156 A1   Jan. 5, 2006

Related U.S. Application Data

(60) Provisional application No. 60/585,191, filed on Jul. 1, 2004.

(51) Int. Cl.
*G06F 3/00* (2006.01)
(52) U.S. Cl. .................................. 715/708; 715/740
(58) Field of Classification Search .................. 715/708, 715/740
See application file for complete search history.

(56) References Cited

U.S. PATENT DOCUMENTS

| | | | | |
|---|---|---|---|---|
| 5,283,856 A | * | 2/1994 | Gross et al. ................ 706/47 |
| 6,049,831 A | * | 4/2000 | Gardell et al. ............. 709/236 |
| 6,128,012 A | * | 10/2000 | Seidensticker et al. ...... 345/685 |
| 6,460,180 B1 | * | 10/2002 | Park et al. ................... 725/40 |
| 6,842,877 B2 | * | 1/2005 | Robarts et al. .............. 715/708 |
| 6,973,620 B2 | * | 12/2005 | Gusler et al. ............... 715/708 |
| 7,203,635 B2 | * | 4/2007 | Oliver et al. ................. 703/22 |
| 7,278,106 B1 | * | 10/2007 | Mason ........................ 715/744 |
| 7,631,296 B2 | * | 12/2009 | Seshadri et al. ............ 717/117 |
| 7,681,203 B2 | * | 3/2010 | Mandato et al. ............ 719/316 |
| 2002/0083025 A1 | | 6/2002 | Robarts et al. ............. 706/12 |
| 2003/0182394 A1 | * | 9/2003 | Ryngler et al. ............. 709/217 |
| 2005/0192916 A1 | * | 9/2005 | Serrano-Morales et al. ... 706/47 |
| 2006/0248045 A1 | * | 11/2006 | Toledano et al. ............ 707/2 |

FOREIGN PATENT DOCUMENTS

| | | |
|---|---|---|
| DE | 103 05 168 A1 | 8/2004 |
| EP | 0 936 794 A2 | 8/1999 |
| EP | 0 936 794 A3 | 8/1999 |

(Continued)

OTHER PUBLICATIONS

Panu Korpipaa, Managing Context Information in Mobile Devices, Jul. 2003, IEEE CS and IEEE ComSoc, pp. 42-51.*

(Continued)

*Primary Examiner* — Phenuel Salomon
(74) *Attorney, Agent, or Firm* — Alston & Bird LLP

(57) ABSTRACT

A mobile terminal includes a user interface specified at least in part by a user. The mobile terminal includes a user interface specification unit that operates in accordance with a programmed data processor to select, in cooperation with the user, at least one trigger and an action, which together form a rule; to automatically generate a directory structure comprising a set of available events in accordance with a hierarchical information model; to select, in cooperation with the user, at least one trigger value from the available set of events and to define an action to be performed by the mobile terminal in responsive to the at least one trigger value being satisfied.

27 Claims, 7 Drawing Sheets

FOREIGN PATENT DOCUMENTS

| | | |
|---|---|---|
| EP | 0 982 959 A2 | 3/2000 |
| EP | 0 982 959 A3 | 3/2000 |

OTHER PUBLICATIONS

International Search Report and Written Opinion for Application No. PCT/IB2005/001855 dated Mar. 3, 2005.
Office Action for Chinese Application No. 200580027307.X dated May 2, 2008.
Office Action for Chinese Application No. 200580027307.X dated Mar. 27, 2009.
Office Action for Chinese Application No. 200580027307.X dated Aug. 4, 2010.
Office Action for Korean Application No. 10-2009-7003279 dated May 4, 2009.
Office Action for Korean Application No. 10-2009-7002394 dated Apr. 17, 2008.
Office Action for Korean Application No. 10-2009-7002394 dated Nov. 18, 2008.
Dey, A. et al., *aCAPpella: Programming by Demonstration of Context-Aware Applications*, Proc. CHI 2004, ACM (2004).
Erickson, T., *Some Problems with The Notion of Context-Aware Computing*, Communications of ACM, 45(2) (2002), 102-104.
Gomez-Perez, A. et al., *Ontological Engineering*, Springer-Verlag, (2003), p. 403.
Greenberg, S., *Context as a Dynamic Construct*, Human-Computer Interaction, 16 (2001, 257-268.
Henricksen, K. et al., *Modeling Context Information in Pervasive Computing Systems*, Proc. International Conference on Pervasive Computing, 2002, LNCS 2414, Springer-Verlag, (2002).
Korpipaa, P. et al., *Managing Context Information in Mobile Devices*, IEEE Pervasive Computing Magazine special issue: Dealing with Uncertainty 2(3), IEEE Computer Society, (2003), 42-51.
Korpipaa et al., *An Ontology for Mobile Device Sensor-Based Context Awareness*, Proc. $4^{th}$ International and Interdisciplinary Conference on Modeling and Using Context 2003, LNAI 2680, Springer-Verlag, (2003), 451-459.
Lakkala, H., *Context Exchange Protocol Specification*, (2003), p. 28 (available: http://www.mupe.net,).
Lakkala, H., *Context Script Specification*, (2003) p. 22 (available: http://www.mupe.net).
Mantyjarvi, J. et al., *Tool for Personalizing Context-Aware Applications in Mobile Terminals*, Proc. Australasian Computer Human Interaction Conference 2003, (2003), 64-73.
Ranganathan, A. et al., *An Infrastructure for Context-Awareness Based on First Order Logic*, Personal and Ubiquitous Computing Journal 7, Springer-Verlag, (2003), 353-364.
Schmidt, A. et al., *Advanced Interaction in Context*, Proc. $1^{st}$ International Symposium on Handheld and Ubiquitous Computing 1999, Springer-Verlag, (1999).
Sohn, T. et al., *2013 ICAP: An Informal Tool for Interactive Prototyping of Context-Aware Applications*, Ext. Abstracts CH103, (2003), 974-975.
Wang, X. et al., *Onotology Based Context Modeling and Reasoning Using OWL*, Proc. Workshop on Context Modeling and Reasoning at IEEE International Conference on Pervasive Computing and Communication, (2004), 18-22.

\* cited by examiner

A MODEL FOR CREATING VOCABULARIES OF CONTEXT TYPES AND CONTEXT VALUES.

AN EXAMPLE CONTEXT TYPE AND A SET OF CONTEXT VALUES

TABLE 1. DEVICE CATEGORY SENSOR-BASED CONTEXT VOCABULARY EXAMPLE CONTEXT TYPES

| CONTEXT TYPE | CONTEXT VALUES |
|---|---|
| DEVICE: ORIENTATION | AntennaUp, AntennaDown, DisplayUp, DisplayDown, DisplayRight, DisplayLeft |
| DEVICE: PLACEMENT | AtHand, NotAtHand |
| DEVICE: ACTIVITY | STILL, ACTIVITY |

FIG. 4

TABLE 2. PHONE CATEGORY ACTION VOCABULARY EXAMPLE ACTION TYPES

| ACTION TYPE | ACTION VALUES |
|---|---|
| PHONE: APPLICATIONS: PROFILES | NORMAL, SILENT, OUTDOORS, MEETING |
| PHONE: JOYSTICK | JoystickUp, JoystickDown, JoystickLeft, JoystickRight, JoystickPress |
| PHONE: KEYPAD | LockKeypad, UnlockKeypad |

FIG. 5

METHOD, APPARATUS AND COMPUTER PROGRAM PRODUCT TO UTILIZE CONTEXT ONTOLOGY IN MOBILE DEVICE APPLICATION PERSONALIZATION

CLAIM OF PRIORITY FROM COPENDING PROVISIONAL PATENT APPLICATION

This patent application claims priority under 35 U.S.C. §119(e) from Provisional Patent Application No. 60/585,191, filed Jul. 1, 2004, the disclosure of which is incorporated by reference herein in its entirety.

TECHNICAL FIELD

This invention relates generally to software tools and, more specifically, relates to software tools useful for, as a non-limiting example, developing a user interface (UI) for a small screen device such as a cellular telephone, where the UI concerns a context ontology having an associated vocabulary model.

BACKGROUND

Current and future mobile terminals can be considered at least in part to be platforms for third party applications, and will support an increasing number of applications and accessories. These demands will place even greater emphasis on the user interface aspects of the mobile terminal.

The notion of adapting application behavior to context has received a significant amount of attention in the literature. Even though the goal of context-aware computing is well-founded and has resulted in developing devices that can sense a situation and adapt their actions appropriately, there is one fundamental problem, i.e., the context awareness exhibited by humans is radically different from that of computational systems (see, for example, Erickson, T., Some problems with the notion of context-aware computing, Communications of the ACM, 45(2), (2002), 102-104). Hard-coded fully automatic actions based on context are rarely useful, and the occurrence of incorrect automatic actions can be frustrating. Greenberg has pointed out (Greenberg, S., Context as a dynamic construct, Human-Computer Interaction, 16 (2001), 257-268) that it is not always possible to enumerate a priori a limited set of contexts, which match the real world context. If such a set is found and it is valid today, it may be inappropriate any other time because of "internal and external changes in the social and physical circumstances". Moreover, determining an appropriate action from a given context may be difficult.

However, it is not necessary to aim at fully automated actions as the only goal of context awareness. Mäntyjärvi et al. (Mäntyjärvi, J., Känsälä, I., Tuomela, U., Häkkilä, J., Context-Studio—Tool for Personalizing Context-Aware Applications in Mobile Terminals, Proc. Australasian Computer Human Interaction Conference 2003, (2003), 64-73) have proposed to use an automation system's categorization for context-based adaptation. Three different levels of automation of context-dependent actions can be distinguished: manual, semi-automated, and fully automated. Manual actions refer to actions made by the user based on context information, which is detected by the device (or the user). In a semi-automated level, the user may predefine application actions based on context detected by the device, or choose from the actions proposed by the device based on context. In the fully automated level the application automatically makes (pre-programmed) actions according to the context detected by the device.

The semi-automated adaptation model partially overcomes the problem identified by Greenberg of determining an appropriate action based on context. If the event-action behavior is defined by the end user instead of the application developer, a greater degree of personalization and flexibility can be achieved. Further flexibility is achieved by permitting the user to change the event-action configurations, if required, when the circumstances change over time.

Ranganathan and Campbell (Ranganathan, A., Campbell, R., An infrastructure for context-awareness based on first order logic, Personal and Ubiquitous Computing Journal 7, Springer-Verlag, (2003), 353-364) introduced a first order logic-based rule model and distributed framework for defining context-based application actions. As further work, the authors identify developing a graphical interface, which would enable the user to choose from the available contexts and actions the elements of a rule, instead of writing first order logic. Sohn and Dey (Sohn, T., Dey, A., 2003 ICAP: An Informal Tool for Interactive Prototyping of Context-Aware Applications, Ext. abstracts CHI03, (2003), 974-975) introduced an informal pen-based tool that allows users to define input devices that collect context information, and output devices that support response. Inputs and outputs can be combined into rules and tested with the tool. However, this tool is not designed for small screen mobile terminals and devices, nor are the user interface elements generated based on an explicit information model. The authors identify as future work the goal of enabling both designers and end-users to create and modify context-aware applications. Dey et al. (Dey, A., Hamid, R., Beckmann, C., Li, I., Hsu, D, a CAPpella: Programming by Demonstration of Context-Aware Applications, Proc. CHI 2004, ACM, (2004)) experimented with a programming-by-demonstration approach for prototyping context-aware applications. The authors developed a tool which allows the user to train and annotate by example models of context, which can be bound to actions. Again, the user interface of the tool is not designed for small screen mobile devices. Furthermore, the focus differs from the focus that is more pertinent to this invention, which is related to a scalable model for representing contexts of an ontology in the UI, where contexts are freely selectable by the user.

Context ontology can be applied for enumerating all the possible context events that can be used for activating actions. Many definitions for ontologies are available (see Gomez-Perez, A., Fernandez-Lopez, M., Corcho, O., Ontological Engineering, Springer-Verlag, (2003), 403 p.). As employed herein, a purpose of ontology is expressing information so that it is easily understandable to humans and readable by machines. The human understandability of context information enables the mobile device end user to configure context aware features. The machine readability of context information enables dynamically forming user interface elements based on the ontology. Moreover, the ontology facilitates describing rules as Context Exchange Protocol (CEP) XML scripts, which can be executed by an inference engine (Lakkala, H., Context Script Specification, (2003), 22 p. hereafter Lakkala 2003b).

Many context models and ontologies have appeared in the literature, e.g. (Schmidt, A., Aidoo, K. A., Takaluoma, A., Tuomela, U., Laerhoven, K., Van de Velde, W., Advanced interaction in context, Proc. 1st International symposium on handheld and ubiquitous computing 1999, Springer-Verlag, (1999); Henricksen, K., Indulska, J., Rakotonirainy, A., Modeling Context Information in Pervasive Computing Systems, Proc. International Conference on Pervasive Computing 2002, LNCS 2414, Springer-Verlag, (2002); and Wang, X., Zhang, D., Gu, T., Pung, H., Ontology Based Context Modeling and Reasoning using OWL, Proc. Workshop on Context Modeling and Reasoning at IEEE International Conference on Pervasive Computing and Communication, (2004), 18-22).

The above-mentioned Context Studio is an application personalization tool for semi-automated context-based adaptation. Application personalization is performed with a graphical user interface, which allows the user to map contexts to application actions. The Context Studio concept was introduced by Mäntyjärvi et al. (2003), who also presented a usability evaluation for a proof-of-concept prototype of the tool. The evaluation results indicated that test persons were able to outline the principle of application specific contextual settings, but they had difficulties in expressing valid user defined conditions. The subjective idea of context in the usage scenarios varied between test persons, affecting their selections. Moreover, the subjects had difficulties in constructing rules that involved the use of multiple Boolean operators.

It would therefore be desirable to overcome at least some of the usability problems found in the earlier Context Studio study.

In addition, the user interface of the earlier prototype was not designed specifically for use with the typically small screens of mobile devices. The lack of screen space requires different methods for information presentation and navigation.

SUMMARY OF THE INVENTION

The foregoing and other problems are overcome, and other advantages are realized, in accordance with exemplary embodiments of the invention.

In one aspect of this invention there is provided a mobile terminal having a user interface that is specified at least in part by a user. The mobile terminal, such as a cellular telephone, or a PDA, or a gaming device, or a digital camera, has a user interface specification unit that operates in accordance with a programmed data processor to select, in cooperation with the user, at least one trigger and an action which together form a rule; to automatically generate a directory structure comprising a set of available events in accordance with a hierarchical information model; to select, in cooperation with the user, at least one trigger value from the available set of events and to define an action to be performed by the mobile terminal in responsive to the at least one trigger value being satisfied.

The at least one trigger value may be satisfied in accordance with a value generated within the mobile terminal, such as in accordance with a value generated by a mobile terminal sensor, and/or the at least one trigger value may be satisfied in accordance with a value generated external to the mobile terminal.

In one non-limiting embodiment a rule script is obtained externally from another user, and in another non-limiting embodiment a rule script is obtained externally from a third party rule script provider, such as by being downloaded over-the-air.

In a further non-limiting aspect of this invention there is provided a computer program product that is stored on a computer readable medium and that includes program instructions to direct a data processor to respond to an input to define a user interface for a mobile terminal. The computer program product includes program instructions to select at least one trigger and an action, which together form a rule; to automatically generate a directory structure of available events is in accordance with a hierarchical information model; to select at least one trigger value from the available set of events and to define an action to be performed by the mobile terminal accordingly.

Also provided is a method and a tool for specifying at least one aspect of a user interface for a device.

BRIEF DESCRIPTION OF THE DRAWINGS

The foregoing and other aspects of embodiments of this invention are made more evident in the following Detailed Description of the Invention, when read in conjunction with the attached Drawing Figures, wherein:

FIG. 4 shows a Table 1 of device category sensor-based context vocabulary example context types.

FIG. 5 shows a Table 2 of phone category action vocabulary example action types.

DETAILED DESCRIPTION OF THE INVENTION

Figure 1:
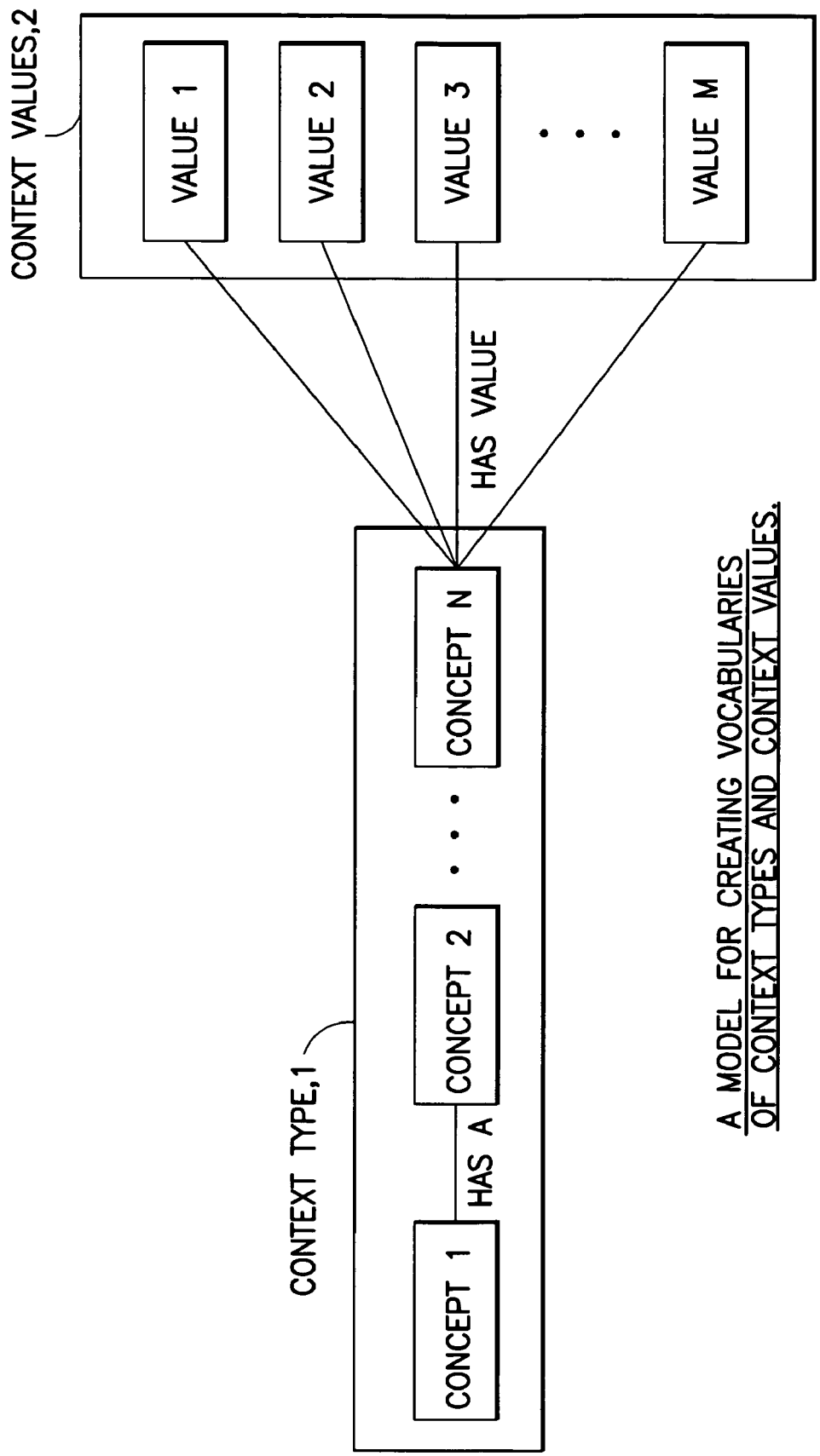
FIG. 1 shows a model for creating vocabularies containing context types and context values.

Context and action vocabulary models, a rule model and a context framework (see Korpipää, P., Mäntyjärvi, J., Kela, J., Keränen, H., Malm, E-J, Managing Context Information in Mobile Devices, IEEE Pervasive Computing Magazine special issue: Dealing with Uncertainty 2(3), IEEE Computer Society, (2003), 42-51, hereafter Korpipää et al. 2003) are utilized in the exemplary embodiments of this invention. These models enable dynamic management of rules and extensible context vocabularies, and enable automatically generating elements of the user interface at runtime.

The exemplary embodiments of this invention use an ontology model for sensor-based mobile context (see Korpipää, P., Mäntyjärvi, J, An Ontology for Mobile Device Sensor-Based Context Awareness, Proc. 4th International and Interdisciplinary Conference on Modeling and Using Context 2003, LNAI 2680, Springer-Verlag, (2003), 451-459, hereafter Korpipää, & Mäntyjärvi, and see also Korpipää et al. 2003), and present a more detailed vocabulary model as an enhancement to previous models.

As was stated above, a purpose of ontology can be to express information so that it is easily understandable to humans and readable by machines. As employed herein an ontology may be perceived as a general model that is capable of including whatever components or abstractions (e.g., devices, moments in time, places, etc.) that are desired by the user. In general, ontologies can be divided into lightweight and heavyweight, based on the degree of "depth" and restrictions (axioms, constraints) on domain semantics. The ontology applied in the exemplary and non-limiting embodiments of this invention may be considered a lightweight ontology, including concepts, concept taxonomies (vocabularies), and properties (structure) that describe concepts. Moreover, ontologies can be characterized according to the level of formality: highly informal (natural language), semi-informal, semi-formal, and rigorously formal. The ontology that may be used in this invention is considered semi-informal, since it is expressed in a "restricted and structured form of natural language" (Gomez-Perez et al. 2003). However, this invention is not limited for use with only lightweight ontologies, or with semi-informal ontologies.

The context ontology applied in Context Studio, also referred to herein as a user interface personalization tool, has two parts: structure and vocabularies. Structure defines the common properties of context that are used across different domains and applications. Vocabularies are application-dependent or domain-dependent expandable context conceptualizations, which aim at understandability and simplicity for the end-user as well as the application programmer. New vocabularies are developed for new domains.

The ontology structure is defined as a set of properties. In the exemplary and non-limiting embodiments of this invention each context (object) is described using six properties, Context type, Context value, Source, Confidence, Timestamp and Attributes (see Korpipää & Mäntyjärvi 2003). Defining context vocabularies concerns defining sets of Context types and Context values (see, as non-limiting examples, FIG. 6). Other properties that are not germane to an understanding of this invention are not discussed herein in any further detail.

Ontology vocabularies are designed according to the domain or application needs. Vocabulary design is a process of defining human-understandable domain-specific or application specific values for the Context type and Context value properties. It is preferred, but not a limitation on the practice of this invention, that these values categorize and describe possible real world situations so that the information is useful for applications, and understandable to humans.

Figure 2:
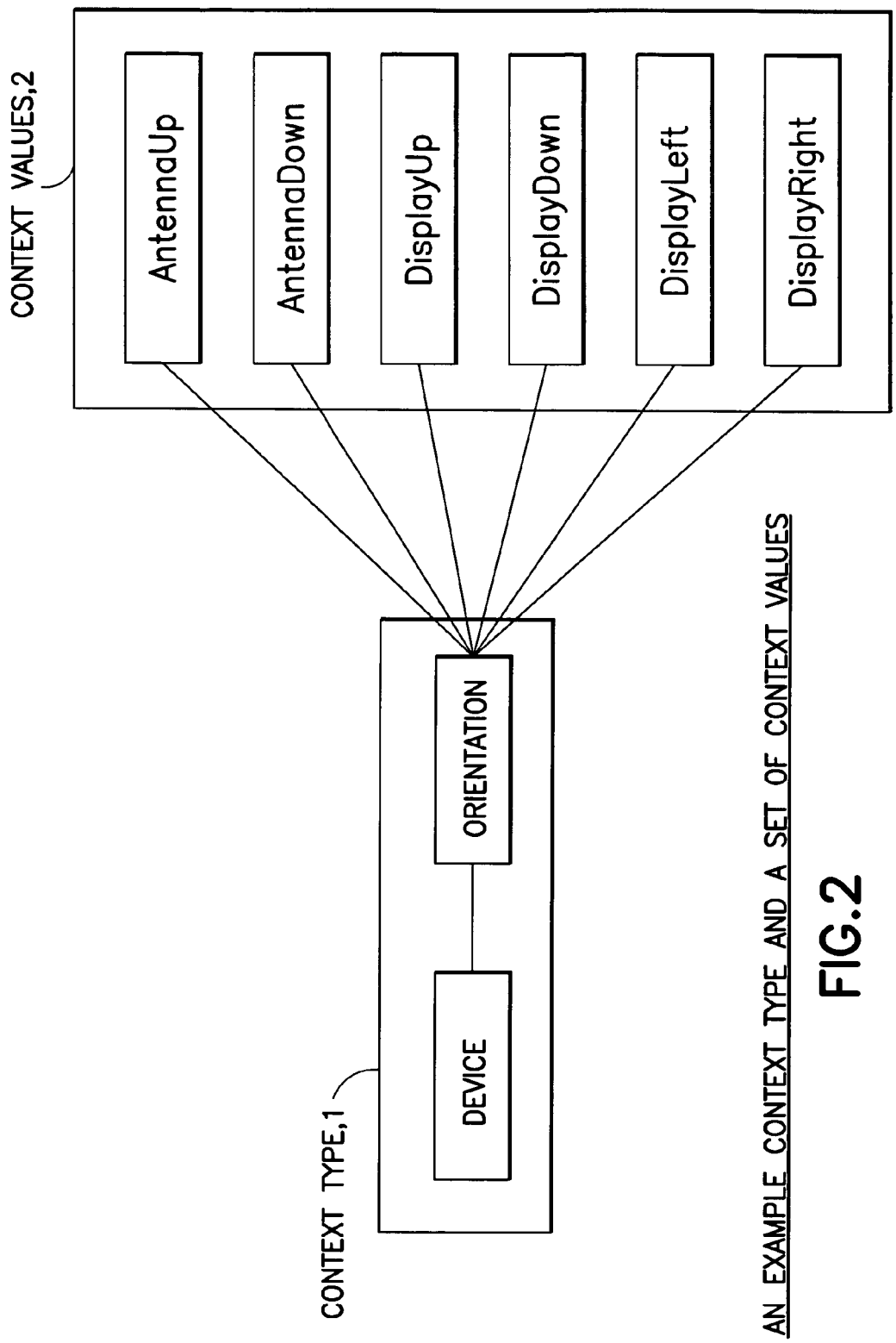
FIG. 2 depicts an example of context type and a set of context values.

Referring to FIGS. 1 and 2, context types 1 are defined to name and categorize context values. The context type 1 resembles a variable name, while context values 2 resemble the set of values for the variable. FIG. 1 illustrates an exemplary vocabulary model for one context type 1 and a set of context values 2 for the context type 1. FIG. 2 shows a non-limiting example of one context description for the vocabulary. A context type 1 can have one or more concepts (e.g., Concept1, . . . , ConceptN), and each context type 1 can have one or more context values (Value1, . . . , ValueM). A context instance at a certain time can have one of the values (1–M) for each context type 1. Different context types may have at least one common concept. Hence, it is possible and useful to form a tree hierarchy of context type 1 concepts, where the leaf nodes represent the context values 2. The hierarchy can be utilized in querying and subscribing to branches of the context tree, instead of only one path.

The context type concepts are preferably categorized from generic towards specific, so that more generic concepts are to the left towards the root, and more specific concepts are to the right toward the leaves. In this manner context types 1 can have common, more generic concepts, but are separated by the more specific concepts.

For simplicity and ease of use, long context types are preferably avoided. For example, as a maximum a context type 1 may have, as a non-limiting example, three or four concepts. For example, if the context type 1 concepts are modeled as folders in a user interface, navigating deep folder hierarchies can be a slow process. On the other hand, context types 2 should be specific enough to enable them having a small set of values 2. Too large of a set of values 2 is difficult to handle, at least in a user interface, if the user has to choose from a set of values. In the exemplary embodiments of this invention each context value 2 has a potential relevance to some application.

Table 1 shown in FIG. 4 presents an example of a context vocabulary that describes device category contexts that are abstracted from acceleration and touch sensor data. It can be noted that the example context of FIG. 2 is described in text form in the first row of Table 1, where two concepts (Device, Orientation) are associated with six values related to antenna and display orientations (e.g., up, down left, right).

Actions to be performed based on contexts 1 can be represented by using the context vocabulary model. In the exemplary embodiments of this invention actions are defined with two properties, Action type 3 and Action value 4, which describe actions in a manner analogous to how Context type 1 and Context value 2 describe contexts. Table 2 shown in FIG. 5 presents an example of an action vocabulary for Action types Phone: Applications: Profiles; Phone: Joystick; Phone: Keypad and associated Action values 4. Moreover, external devices can announce their actions, which can dynamically be included as Context Studio action vocabularies.

An ontology vocabulary model enables generating elements of the Context Studio user interface from the vocabularies. The hierarchical vocabularies are extensible and modifiable, and these qualities are inherited by the generated UI. Without the concept hierarchy, flat lists of context values would easily grow too large to enable usable interaction.

Naming Conventions

The context management of Context Studio is preferably designed to utilize the context framework (see Korpipää et al. 2003). Appropriate naming may be considered as essential, particularly in describing the properties, context type, context value, and source, which are required for each context object added to a context manager "blackboard". These properties are also used for accessing context information from the context manager. There are two main aspects to be considered in naming context types. First, appropriate naming should reflect the meaning of context to the user, which is typically either the application developer or the personalization tool user. Naming preferably reveals the use of context. Second, the use of a correct naming convention ensures that the user of context information can fully utilize the features provided by the context manager.

When context types are built as paths containing elements from the generic concept to the specific concept, the context information can be accessed with partial context types that represent a larger context information subset. This naming convention has been utilized also in the above-noted Context Exchange Protocol (CEP), where the reference to a subset of the context type hierarchy is referred to as a wildcard (see Lakkala, H., Context Exchange Protocol Specification, (2003), 28 p. hereafter referred to as Lakkala 2003a). Moreover, CEP recommends that vendor-specific context types are named starting with a prefix that names the vendor, e.g., "x-vendor_name:", followed with the normal context type definition.

The set of context values may be numerical or symbolic. If context values are described as numerical, for application use they preferably should have an explicit meaning to humans, such as environmental temperature in degrees. If raw numerical measurement values are used, naming a context value set is not required, and the context type 1 can be used normally. If context values 2 are defined for the purpose of application personalization by the user, it is preferred that they be human understandable, symbolic, and the number of values in the set should be few enough to allow selecting a value from the set to function as a condition in a rule. When a small set of values is required, numerical values can be divided into named intervals, e.g., a temperature value may be "over 20". Several other methods exist for abstracting numerical values into symbolic values (see, for example, Korpipää et al. 2003).

The context source property is not described in the vocabularies, but it is required if there are many context providers for the same context type 1, and if a client is interested in contexts originating from a particular source. A naming policy for the source is thus desirable for avoiding naming conflicts between different context information providers. The categories of sources can be referred to as: terminal internal and terminal external. Terminal internal sources can be named starting with the prefix "Terminal:" or "Phone:", as two non-limiting examples, followed with a description of the source, such as a sensor name. If the terminal source has multiple elements, it is preferably named similarly to the context type 1, where the name forms a path, e.g., "Terminal:Sensor:Acceleration". The terminal external sources can be named as protocol statements identifying the provider, e.g., "http://context_provider.com/context_type" (see Lakkala 2003a).

Context Studio Rules

Context Studio enables the user to specify rules that connect contexts to actions. Once the rules are active in the mobile device, contexts cause actions, as specified in the rule. Rule condition part elements are called triggers. A trigger can be any event or state that can be used for activating an action. Triggers are instances of the context vocabulary. Context type 1 (variable name) and context value 2 (variable value) together define a trigger. An action is any application, function, or event that can be activated when a set of triggers occur, where a trigger set has at least one member. A rule action part element is referred to as an action. For clarity, one rule may contain one action. Action type 3 and Action value 4 define an action.

A rule is an expression connecting a set of triggers to an action. In the exemplary embodiments of this invention rules contain one action element and at least one trigger element. Rules are of the form: IF trigger(s) THEN action. In order to make the specifying of rules simple for the user, it is preferred that the only operator for connecting triggers is AND. An example of a rule containing multiple triggers is as follows: IF trigger1 AND trigger2 AND trigger3 THEN action. In exemplary embodiments of this invention the operator OR is implemented by allowing the user to specify additional parallel rules for the same action. Note, however, that in other embodiments of this invention a mixture of operators (e.g., OR and AND, and/or other Boolean operators) may be employed in the same rule. Also in the exemplary embodiments of this invention the user is allowed to make incomplete rules, i.e., the action or trigger part can be omitted. Incomplete rules are represented with icons as disabled in the UI.

Figure 3:
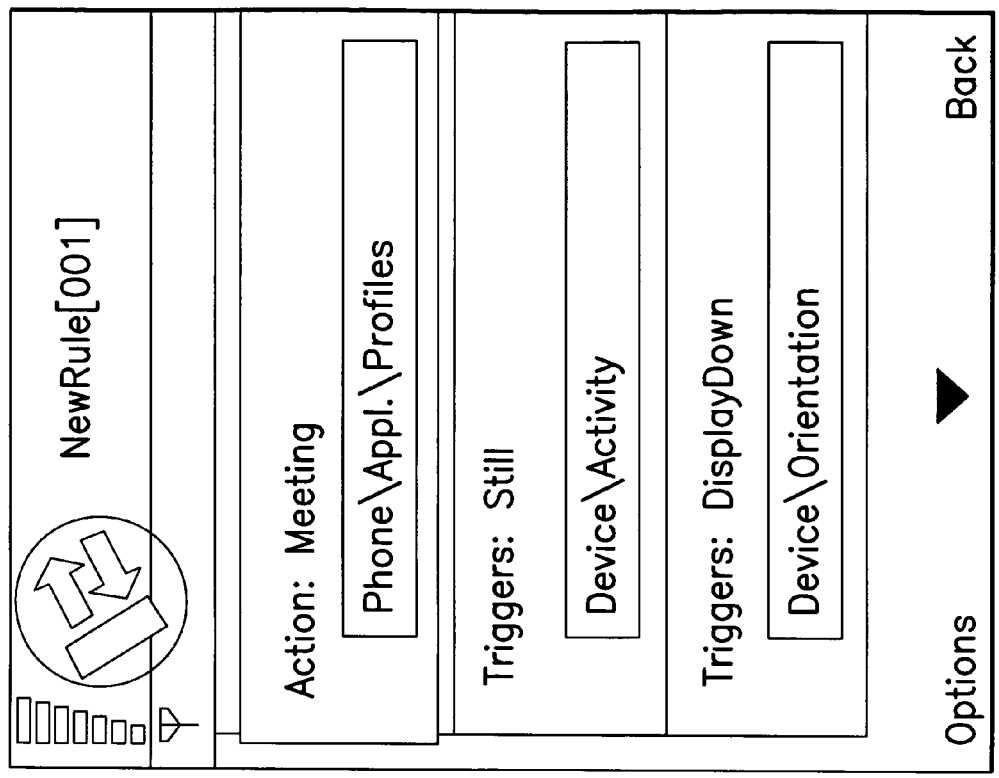
FIG. 3 depicts an example of a Context Studio rule edit view, and an example of a corresponding CEP script.

Context Studio adopts the CEP context script representation for rules (Lakkala 2003a, 2003b). Context scripts are semi-formal XML descriptions, which can be used for describing rules. A non-limiting example of a rule described as a context script is shown in FIG. 3 for the example Rule:

If the device is still and display down, then set the phone audio profile to "Meeting".

The example Rule causes the device profile to be set to "Meeting" if the device orientation is display down and the device is still. Rules conforming to the script specification and Context Studio rule form may be displayed in the user interface as shown. Hence, it is possible to use rules defined by others, and the exchange of rule scripts over the air with other users may be accomplished, as may be the downloading of rule scripts over the air from a rule source. However, some rules may be personal and thus not usable by others. For example, if the location of person's home is bound to location coordinates, the description would not be valid with the home of anyone else (unless it were, for example, another family member of the user residing at the same location). It should be noted that the fonts shown in FIG. 3 are not necessarily drawn to scale.

The rule scripts can be created, viewed and edited in the UI Rule view. FIG. 3 presents the view of the Rule given in the example CEP script.

Context management in Context Studio is preferably based on the blackboard-based context framework for mobile devices (see Korpipää et al. 2003) and rule scripts are evaluated with an inference engine, called a script engine (Lakkala 2003a) that uses a context manager. Conditional operations such as And, Or, Not, Equal, Not Equal, Less, Greater, Less Or Equal, Greater Or Equal and In Range are supported by the context script model and by the inference engine. In an exemplary online system, the context manager receives all context information from context sources and abstractors, and indicates to the script engine upon changes in those contexts that are used in the rule scripts generated by the Context Studio, defined by the user with the graphical UI. The script engine evaluates the rules for the changed contexts, and fired rules are used for activating application actions or platform events, as defined in the rule.

User Interface

Context Studio rules are preferably specified by the user using a graphical user interface (GUI) also referred to as simply the user interface (UI), following the notion of a semi-automatic adaptation model. The user interface is an application of context ontology. The representation of triggers and actions is based on the ontology vocabulary model. The Trigger, Action and Rule view elements in the UI may be automatically and dynamically generated based on the ontology and rule models. The ontology hierarchy may be transformed into a folder-file model representation in the UI to facilitate user navigation. Context and action type concepts may be represented as folders and subfolders, according to the vocabulary hierarchy. Context and action values correspond to files in the concept folders. Extending and modifying vocabularies is possible at runtime, and the UI can be updated correspondingly. New context and action types are presented as new paths in the UI, and new context and action values are presented as new files in the folders.

The UI in a non-limiting example of the use of embodiments of this invention is one designed for small size screens, such as those encountered in handheld mobile devices and terminals such as, but not limited to, cellular telephones, gaming devices, digital cameras, music storage and playback appliances, Personal Digital Assistants (PDAs) and other devices and terminals having a limited display screen area.

Figure 7:
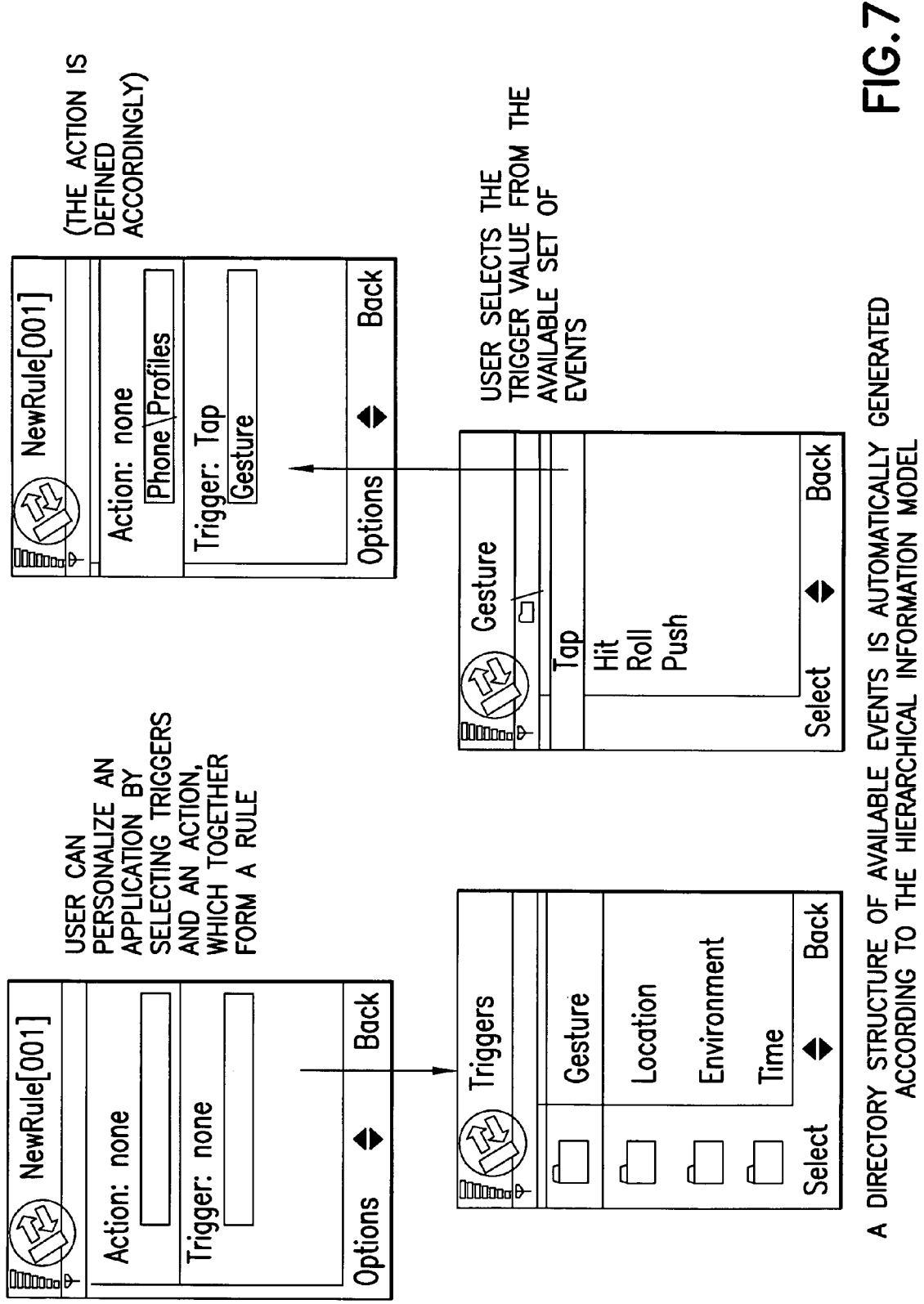
FIG. 7 shows a multi-step process of creating a rule.

Assume as a non-limiting example that the user is navigating a Device category context vocabulary in order to find the correct trigger for the rule given in the earlier example. The user follows a path Device\Movement and, after choosing the Gesture-type context value Tap, the view is returned to the rule edit view as shown in the example of FIG. 7. The action hierarchy may be displayed and navigated in a similar manner in the UI.

Two exemplary scenarios within which a user may desire to construct rules are as follows:

Scenario 1: You often call your best friend Mike. You want to be able to do the call quickly and without watching the phone, as you many times call him while driving a car or riding a bicycle. The phone recognizes a 'shaking' movement. Now you want to determine that when you shake the phone, it begins calling Mike.

Scenario 2: You quite often spend an evening in a nightclub with your friends. When you are clubbing, you want your phone to turn to the 'Outdoor' profile so that you are able to hear when you receive a call or a message, and so you define an automated profile change. The result is that the alerting volume is automatically increased to that of the Outdoor profile level.

Figure 6:
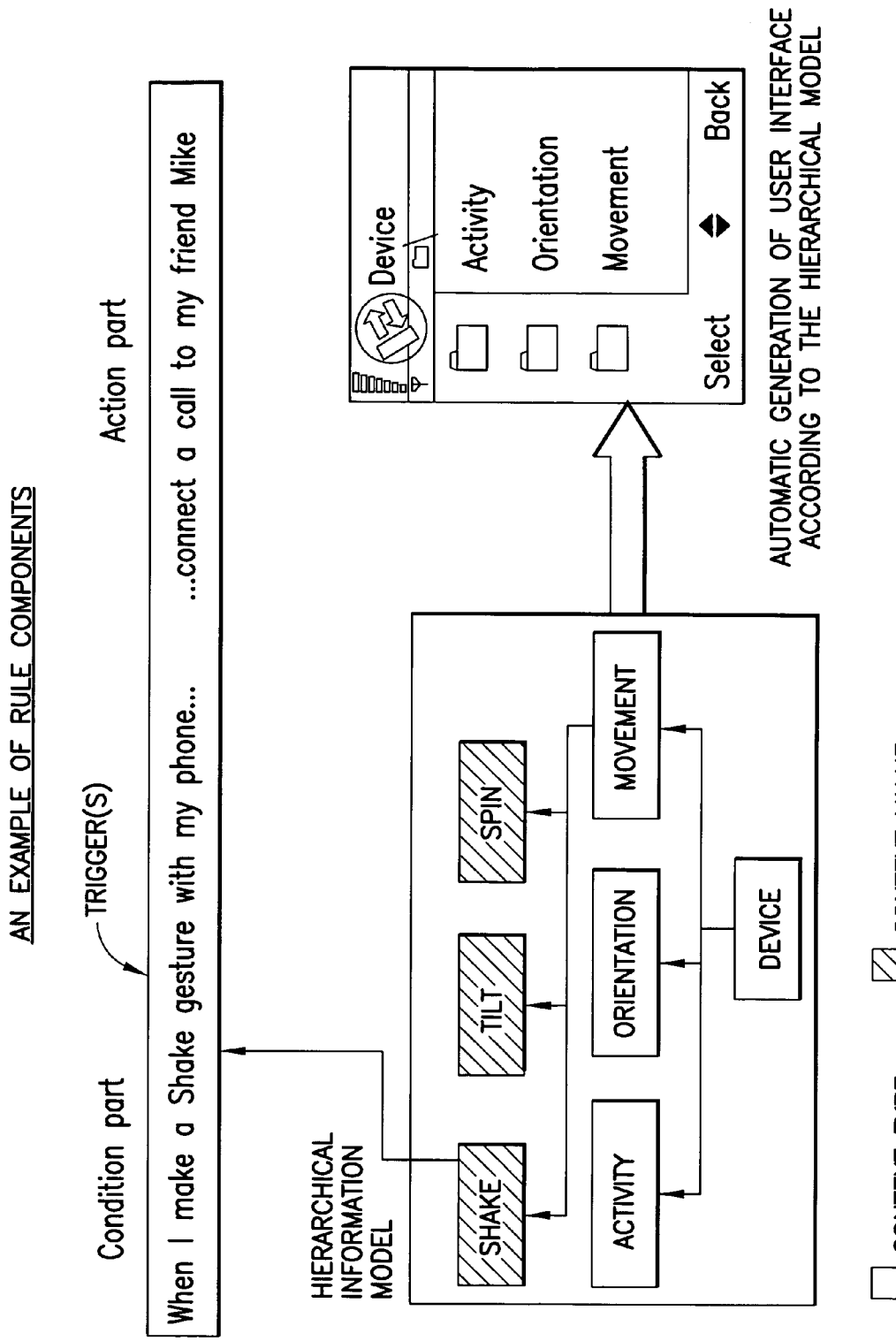
FIG. 6 depicts rule components and a mapping device UI according to an exemplary use of a hierarchical information model.

Suitable rules corresponding to these exemplary scenarios may be constructed by selecting appropriate definitions at the rule edit window, FIG. 3. The selected values may be found by navigating in the 'triggers' and 'actions' hierarchical folder structure. Reference is also made to FIG. 6, which shows a non-limiting example of trigger(s), an action part, the hierarchical information model (e.g., Device==>Movement==>Shake/Tilt/Spin), and the resulting automatic generation of a UI according to the hierarchical model.

In embodiments of the application personalization tool for semi-automated context-based adaptation, also referred to herein as Context Studio, the UI is designed to utilize context ontology. The ontology vocabulary hierarchy is preferably, but not by way of a limitation, transformed into a folder-file model representation in the UI. The ontology, with an enhanced vocabulary model, offers a scalable information representation, and easy navigation of context and action information in the UI, and enables updating the UI straightforwardly according to changes in the vocabularies.

Furthermore, the ontology supports the utilization of context scripts as a formal rule model.

Based on the foregoing description it can be appreciated that the exemplary embodiments of this invention enable a platform-independent dynamic personalization of mobile terminal applications and accessories based on different sources of information. Personalization is preferably performed by the end user interacting with a tool having a graphical user interface, elements of which are generated according to descriptions from available sources of information. Example information sources for personalization include gestures, terminal events, sensor events, external network sources, tags, location, presence, etc. Example applications to be controlled include functions announced by external devices, profiles, terminal controls and, in general, any available terminal application function.

The exemplary embodiments of this invention as described above provide a model for describing events from sources of information and application actions. Elements of the graphical user interface of the personalization tool may be automatically and dynamically generated, while maintaining a high usability of the tool.

The exemplary embodiments of this invention address the need of mobile terminal users who have different preferences in using a potentially large amount of available applications and accessories. Therefore, the use of terminal applications and accessories is made more easily configurable by the user, with minimal interaction. The use of terminal applications and accessories is also made more flexible.

As an analogy, there may be a need for configuring more "soft keys". "Soft keys" may be considered, in accordance with the non-limiting embodiments of this invention, to be any events that activate any terminal application functions or functions announced by accessories.

The exemplary embodiments of this invention thus enable a user to uniformly describe events (e.g., "soft keys") that can be used for activating actions, and for uniformly describing the actions of terminal applications or accessories. The model facilitates expressing information so that it is easily understandable to humans and readable by machines. The human understandability enables a mobile terminal end user to personalize the mobile terminal. The desired machine readability feature enables dynamically forming user interface elements. Moreover, the model enables a formal description of user-specified condition-action rules, thereby facilitating platform independent personalization. In exemplary embodiments the rules are generated from graphical descriptions specified by the user with the graphical UI (GUI).

Reference in this regard is again made to FIG. 6 and to FIG. 7. FIG. 6 shows a simplified, non-limiting illustration rule components of the model, while FIG. 7 shows the formation of a rule based on a directory hierarchy generated from the model vocabulary. In FIG. 7 a user selects at least one trigger and an action, which together form a rule. As an example of trigger definition, a directory structure of available trigger events is automatically generated according to the hierarchical information model (see FIG. 6); the user selects a type of trigger value from the available set of triggers (in this case "Gesture") and then selects a particular Gesture trigger value (in this case "Tap"). The Action can be defined accordingly.

Advantages that are realized by the use of this invention include, but need not be limited to, the facilitation of the dynamical configuring of terminal applications and accessory functions based on any available event; the platform-independent personalization of functions; the dynamic generation of UI elements; a scalability of the information model and the resultant generated UI model; the ability to provide rule scripts from external sources (e.g., other users or third part rule script providers); the ability to use multiple sources, such as sensors, as events for application control; and the ability to specify gestures for application control.

In one aspect this invention provides an ontology tool based at least in part on the above-noted Context Studio which is an application personalization tool for semi-automated context-based adaptation to implement context aware features. In embodiments of this invention the Context Studio concept is further developed for the end-users of small screen mobile devices. Context ontology, with an enhanced vocabulary model, is utilized to offer scalable representation and easy navigation of context and action information in the UI. The ontology vocabulary hierarchy is transformed into a folder-file model representation in the graphical user interface. In the exemplary embodiments the UI elements can be directly updated according to the extensions and modifications to ontology vocabularies, automatically in an online system. A rule model is utilized to allow systematic management and presentation of context-action rules in the user interface.

The exemplary embodiments of this invention further develop the Context Studio concept, or more generically an application personalization tool for semi-automated context-based adaptation, for end-users of small screen mobile devices, enabling navigation and information presentation to be more optimally designed for use on small screens. The context ontology and vocabulary model enable generating user interface elements automatically and dynamically. The ontology hierarchy is transformed into a directory model representation for the user interface, thereby facilitation navigation. Extensions and modifications to the ontology vocabularies can be automatically updated into the UI. A rule model is utilized to allow systematic management and presentation of rules in the user interface.

Figure 8:
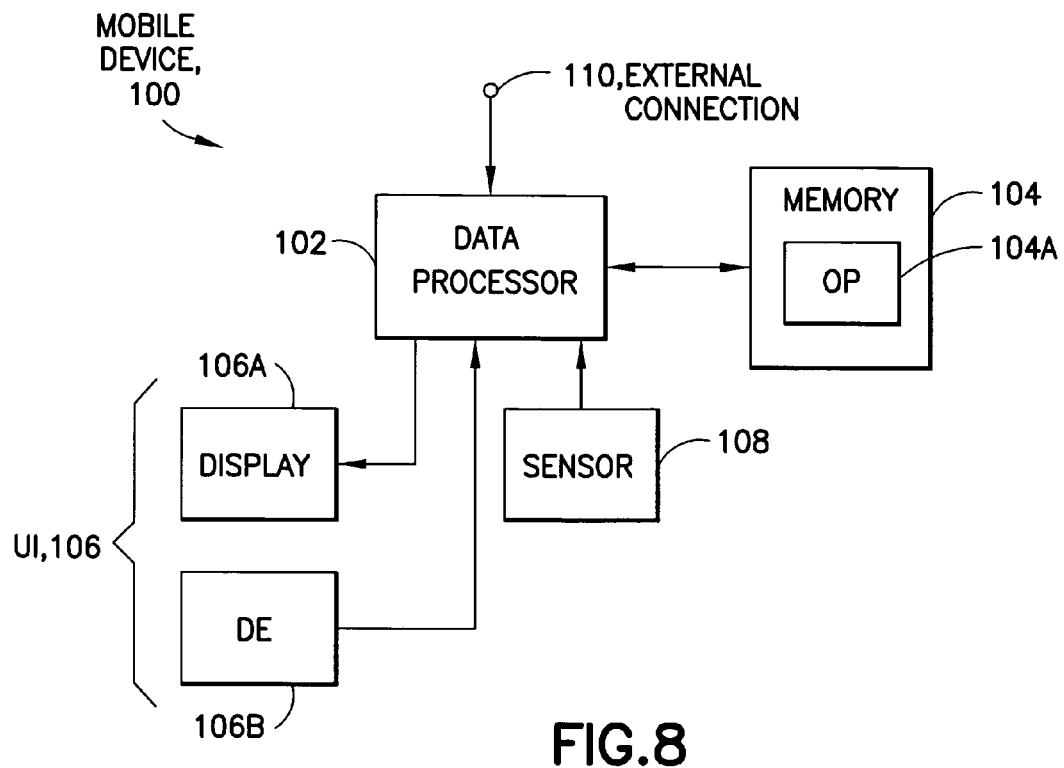
FIG. 8 shows a simplified block diagram of a mobile device that may be used to implement this invention.

FIG. 8 shows a simplified block diagram of a non-limiting embodiment of a device 100, such as a mobile device, e.g., a mobile communication terminal, that may be used to implement the exemplary embodiments of this invention. Non-limiting examples of suitable mobile devices include, but are not limited to, cellular telephones, personal digital assistants (PDAs), portable computers, image capture devices such as digital cameras, gaming devices, music storage and playback appliances and handheld units or terminals that incorporate combinations of such functions. The mobile device 100 includes a data processor 102 connected with a memory 104 (at least a portion of which may be a non-volatile memory (NVM) device for storing defined Rules) that stores at least an operating program (OP) 104A for the data processor 102, where the operating program 104A is assumed to enable the execution of the methods in accordance with the embodiments of this invention. The mobile device 100 also includes a user interface 106 comprising a display screen 106A (or equivalent data presentation device) for display of the UI and at least one data entry (DE) device 106B, such as a keypad or a keyboard, or a pointing device, or a touch screen, or a combination of data entry devices. By the use of these components the user is enabled to define Rules, as shown by the examples of FIGS. 1-7, which are then stored in the memory 104. The mobile device 100 may also include at least one sensor 108, such as an accelerometer and/or a thermometer and/or a mechanical switch and/or a location determining subsystem, (such as GPS receiver), that is capable of sensing some internal and/or environmental condition of the mobile device 100 in order to provide a data input for trigger state determinations (e.g., to determine the orientation and/or movement of the mobile device 100 in three dimensional space). Note that at least some of these components, such as the data processor 102 and user interface 106, may be physically located remotely from the mobile device 100, such as in a desktop PC or workstation, and any Rules that are defined using the external user interface can be inputted to the mobile device 100 for storage in the memory 104, either through a wired or a wireless external connection 110. Note that the above-mentioned scripts can also be inputted to the mobile device 100 though the wired or wireless external connection 110.

The memory 104 may be of any type suitable to the local technical environment and may be implemented using any suitable data storage technology, such as semiconductor-based memory devices, magnetic memory devices and systems, optical memory devices and systems, fixed memory and removable memory. The data processor 102 may be of any type suitable to the local technical environment, and may include one or more of general purpose computers, special purpose computers, microprocessors, digital signal processors (DSPs) and processors based on a multi-core processor architecture, as non-limiting examples.

Figure 9:
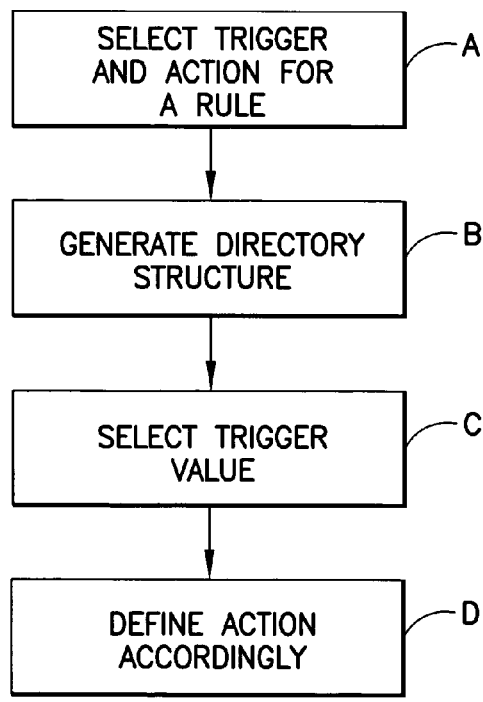
FIG. 9 is a simplified logic flow diagram in accordance with a method that may be executed by the data processor under control of an operating program to define a user interface for the mobile device of FIG. 8.

FIG. 9 is a simplified logic flow diagram in accordance with a method that may be executed by the data processor 102 under control of the operating program 104A to define a user interface for the mobile terminal or device 100. The method includes selecting at least one trigger and an action, which together form a rule (Block A); automatically generating a directory structure of available events in accordance with a hierarchical information model (Block B); selecting at least one trigger value from the available set of events (Block C); and defining an action to be performed by the mobile terminal or device 100 accordingly (Block D).

The exemplary embodiments of this invention may be implemented by computer software executable by a data processor of the mobile device 100, such as the data processor 102, or by hardware, or by a combination of software and hardware. Further in this regard it should be noted that the various blocks of the logic flow diagram of FIG. 9 may represent program steps, or interconnected logic circuits, blocks and functions, or a combination of program steps and logic circuits, blocks and functions.

Various modifications and adaptations may become apparent to those skilled in the relevant arts in view of the foregoing description, when read in conjunction with the accompanying drawings and the appended claims. As but some examples, the use of other similar or equivalent triggers, actions and mobile terminal types may be attempted by those skilled in the art. However, all such and similar modifications of the teachings of this invention will still fall within the scope of this invention.

Furthermore, some of the features of the exemplary embodiments of this invention could be used to advantage without the corresponding use of other features. As such, the foregoing description should be considered as merely illustrative of the principles of the present invention, and not in limitation thereof.

What is claimed is:

1. A method comprising:
   causing a first directory structure of available trigger events to be generated according to a hierarchical information model;
   causing one or more trigger types to be displayed in accordance with the first directory structure;
   receiving selection of at least one trigger type;
   causing, after receiving selection of the at least one trigger type, one or more trigger values associated with the selected trigger type to be displayed in accordance with the first directory structure;
   receiving a selection of at least one trigger value;
   causing a second directory structure of available actions to be generated according to the hierarchical information model;
   causing one or more action types to be displayed in accordance with the second directory structure;
   receiving a selection of at least one action type;
   causing, after receiving selection of the action type, one or more action values associated with the selected trigger type to be displayed in accordance with the second directory structure;
   receiving selection of at least one action value; and
   generating a rule based upon the at least one selected trigger type, the at least one selected trigger value, the at least one selected action type, and the at least one selected action value;
   wherein the selected action, as defined by the selected action type and action value, is to be performed by a device in an instance in which the selected at least one trigger value is satisfied.

2. The method as in claim 1, where the at least one trigger value is satisfied in accordance with a value generated by the device.

3. The method as in claim 1, where the at least one trigger value is satisfied in accordance with a value generated by a sensor that comprises part of the device.

4. The method as in claim 1, where the at least one trigger value is satisfied in accordance with a value generated external to the device.

5. The method as in claim 1, where a rule script is obtained externally from another user.

6. The method as in claim 1, where a rule script is obtained externally from a third party rule script provider.

7. The method as in claim 1, where the hierarchical information model comprises a folder-file representation, where selectable data is sorted by types, where the types are represented as folders and subfolders and the selectable data is represented as files.

8. The method as in claim 1, where the hierarchical information model is configured to have a maximum number of branches.

9. The method as in claim 1, wherein receiving the selection of the at least one trigger value comprises receiving the selection of the at least one trigger type via a data entry device; and
further wherein the trigger values associated with the selected trigger type are caused to be displayed in accordance with the first directory structure in response to receiving the selection of the at least one trigger type.

10. An apparatus comprising:
a memory and a processor, the memory storing computer program code therein, the computer program code being configured to, upon execution, cause the apparatus to:
cause a first directory structure comprising a set of available trigger events to be generated according to a hierarchical information model;
cause one or more trigger types to be displayed in accordance with the first directory structure;
receive selection of at least one trigger type;
cause, after receiving selection of the at least one trigger type, one or more trigger values associated with the selected trigger type to be displayed in accordance with the first directory structure;
receive a selection of at least one trigger value;
cause a second directory structure comprising a set of available actions to be generated according to the hierarchical information model;
cause one or more action types to be displayed in accordance with the second directory structure;
receive a selection of at least one action type;
cause, after receiving selection of the action type, one or more action values associated with the selected action type to be displayed in accordance with the second directory structure;
receive selection of at least one action value; and
generate a rule based upon the at least one selected trigger type, the at least one selected trigger value, the at least one selected action type, and the at least one selected action value;
wherein the selected action, as defined by the selected action type and action value, is to be performed by the apparatus in response to the at least one trigger value being satisfied.

11. The apparatus as in claim 10, where the at least one trigger value is satisfied in accordance with a value generated within the mobile terminal.

12. The apparatus as in claim 10, where the at least one trigger value is satisfied in accordance with a value generated by a mobile terminal sensor.

13. The apparatus as in claim 10, where the at least one trigger value is satisfied in accordance with a value generated external to the mobile terminal.

14. The apparatus as in claim 10, where a rule script is obtained externally from another user.

15. The apparatus as in claim 10, where a rule script is obtained externally from a third party rule script provider.

16. A computer program product comprising a non-transitory computer-readable medium storing program instructions therein, the program instructions being configured to, upon execution, cause an apparatus to:
cause a first directory structure of available trigger events to be generated according to a hierarchical information model;
cause one or more trigger types to be displayed in accordance with the first directory structure;
receive selection of at least one trigger type;
cause, after receiving selection of the at least one trigger type, one or more trigger values associated with the selected trigger type to be displayed in accordance with the first directory structure;
receive a selection of at least one trigger value;
cause a second directory structure of available actions to be generated according to the hierarchical information model;
cause one or more action types to be displayed in accordance with the second directory structure;
receive a selection of at least one action type;
cause, after receiving selection of the action type, one or more action values associated with the selected action type to be displayed in accordance with the second directory structure;
receive selection of at least one action value; and
generate a rule based upon the at least one selected trigger type, the at least one selected trigger value, the at least one selected action type, and the at least one selected action value,
wherein the action, as defined by the selected action type and action value, is to be performed by the apparatus in an instance in which the at least one selected trigger value is satisfied.

17. The computer program product as in claim 16, where the at least one trigger value is satisfied in accordance with a value generated by the mobile terminal.

18. The computer program product as in claim 16, where the at least one trigger value is satisfied in accordance with a value generated by a mobile terminal sensor.

19. The computer program product as in claim 16, where the at least one trigger value is satisfied in accordance with a value generated external to the mobile terminal and communicated to the mobile terminal though a wireless connection.

20. The computer program product as in claim 16, where a rule script is obtained from another mobile terminal.

21. The computer program product as in claim 16, where a rule script is obtained from a third party rule script provider.

22. An apparatus comprising:
means for causing a directory structure comprising a set of available trigger events to be generated according to a hierarchical information model;
means for causing one or more trigger types to be displayed in accordance with the first directory structure;
means for receiving selection of at least one trigger type;
means for causing, after receiving selection of the at least one trigger type, one or more trigger values associated with the selected trigger type to be displayed in accordance with the first directory structure;
means for receiving a selection of at least one trigger value;
means for causing a second directory structure comprising a set of available actions to be generated according to the hierarchical information model;
means for causing one or more action types to be displayed in accordance with the second directory structure;
means for receiving a selection of at least one action type;
means for causing, after receiving selection of the action type, one or more action values associated with the selected trigger type to be displayed in accordance with the second directory structure;
means for receiving selection of at least one action value; and
means for generating a rule based upon the at least one selected trigger type, the at least one selected trigger value, the at least one selected action type, and the at least one selected action value, wherein the action, as defined by the selected action type and action value, is to be performed by the apparatus in response to the at least one trigger value being satisfied.

23. The apparatus as in claim 22, where the at least one trigger value is satisfied in accordance with a value generated by a sensor means that comprises a part of the apparatus.

24. The apparatus as in claim 22, where rules are generated from graphical descriptions specified by the user with a graphical user interface.

25. The apparatus of claim 10, wherein the apparatus is a mobile terminal.

26. The apparatus of claim 22, wherein the apparatus is a mobile terminal.

27. The apparatus as in claim 22, comprising a context ontology and a vocabulary model configured to generate user interface elements automatically and dynamically, and where an ontology hierarchy is transformed into a directory model representation for the user interface.

* * * * *